United States Patent [19]
Gugg

[11] Patent Number: 6,089,967
[45] Date of Patent: Jul. 18, 2000

[54] DE-RINDING TOOL FOR PORK

[76] Inventor: Anton Gugg, Herzog-Odilo-Str. 19, A-5310 Mondsee, Austria

[21] Appl. No.: 09/337,817

[22] Filed: Jun. 22, 1999

[30] Foreign Application Priority Data

Aug. 7, 1998 [DE] Germany ............................ 298 14 162

[51] Int. Cl.[7] ...................................................... A22B 5/16
[52] U.S. Cl. ............................................ 452/127; 452/133
[58] Field of Search ...................................... 452/127, 132, 452/133; 30/276

[56] References Cited

U.S. PATENT DOCUMENTS

| 4,063,332 | 12/1977 | McCullough | 452/133 |
| 4,186,461 | 2/1980 | Leining | 452/133 |
| 4,451,953 | 6/1984 | Leining | 452/133 |
| 4,631,780 | 12/1986 | Leining | 452/133 |
| 4,993,112 | 2/1991 | Burnett et al. | 452/133 |
| 5,326,310 | 7/1994 | Gugg | 452/127 |
| 5,813,904 | 9/1998 | Aslanis et al. | 452/133 |

FOREIGN PATENT DOCUMENTS

| 2 391 039 A1 | 12/1978 | France . |
| 2 627 058 A1 | 8/1989 | France . |
| 2 651 963 A1 | 3/1991 | France . |
| 41 33 361 A1 | 4/1993 | Germany . |

*Primary Examiner*—Willis Little
*Attorney, Agent, or Firm*—Cort Flint

[57] ABSTRACT

The present invention relates to a de-rinding tool for pork, with a knife part and a driven roller as well as with a stripper. According to the invention a fixed stripper as well as a movable stripper are provided, each of these being assigned an output gap by means of which a rind output in vertical and horizontal de-rinding direction can be obtained with easy tool operation so that the exiting rind does not interfere with the de-rinding tool or its operation.

23 Claims, 3 Drawing Sheets

DE-RINDING TOOL FOR PORK

FIELD OF THE INVENTION

The present invention relates to a de-rinding tool for pork to remove the rind section from the meat section of a full or partial hog. More particularly, the invention relates to a de-rinding tool which can be hand-held to safely remove the rind from pork in an efficient manner, while the hog is oriented in either a vertical or horizontal position.

BACKGROUND OF THE INVENTION

In the meat processing industry, it is necessary to strip the rind from the meat when preparing pork. Previous de-rinding tools were designed to be used with the hog suspended in a vertical manner and the de-rinding tool being moved from top to bottom. These previous de-rinders are not suitable for use when the hog is in a horizontal position which requires the de-rinder to move in a horizontal direction. Such a previous de-rinder is shown in German patent DE41 33 361 C2. The invention of this patent shows a de-rinding blade and a driver roller separated by a distance corresponding to the rind thickness. As the de-rinder is moved along the meat, the knife passes between the rind and the meat, thereby cutting the rind from the meat. A single stripping device is provided at the circumference of the roller which strips the rind from the roller. Following the roller is a single output gap on the tool housing through which the stripped rind passes.

The typical de-rinder, as shown in the above German patent, will cause the rind to double over the tool and interfere with the de-rinding process. Additionally, when in the vertical position the rind can fall over the tool and interfere with the user as well as the de-rinding process

SUMMARY OF THE INVENTION

In the present invention, driven width-cutting knives are installed in this de-rinding tool on each side of the de-rinding knife, forming a bilateral limit of the width of the straight knife edge and at a right angle. These driven width-cutting knives neatly cut off the rind on both sides to form a rind strip. In addition, teeth distributed over the circumference of the roller are provided to grasp the rind and hold it on its upper surface, so that the rind knife is pulled through toward the de-rinding knife without slipping so the rind is forced onto the de-rinding knife and cut from the meat.

A first fixed stripper is provided in the tool housing, with its stripping edge being preferably offset by approximately 180° relative to the de-rinding knife in the circumferential and rotational direction of the roller and guiding the rind with a guiding surface to a first output gap which points generally in the de-rinding direction. This configuration provides an exit for the rind in a correspondingly oriented direction. Preferably the rind output is designed through this first output gap for generally vertically downward oriented de-rinding of whole or half hogs in a suspended position.

Furthermore a second, movable stripper is provided, which is designed preferably for horizontal de-rinding. The stripping edge of this second stripper is located in proximity of the de-rinding blade in the vicinity of the roller. In its operational position the second stripper guides the rind with one guiding surface to a second output gap which follows directly the de-rinding knife and which is oriented generally in an opposite direction to the de-rinding direction to promote proper exit of the rind. In this case the rind is stripped from the roller by the second stripper in its operational position, before the first fixed stripper, so that the first stripper and the first output gap are non-operational.

The second stripper can be brought into a closed position, and in this position, guides the rind so that the rind is conveyed unimpeded through the roller and possibly through associated guiding surfaces to the first stripper and to the first output gap.

By using two output gaps in combination with a fixed stripper and a stripper with a movable position, a suitable rind output for vertical or horizontal movement of the tool can be advantageously obtained. The handling of the tool is therefore improved with vertical tool movement as well as with horizontal tool movement by means of a suitably adjusted second stripper.

Another arrangement according to the invention, includes two stripers and two output gaps which can also be combined with separating knives of a predetermined width. In this embodiment, the roller is preferably provided with teeth on its circumference which are advantageously at an angle and are tilted in the direction of rotation so that they hook into the rind. These teeth grip the rind and move it toward the de-rinding knife.

So as to ensure in every instance that the rind does not emerge first through the second output when the second stripper is in its closed position, a cover in the form of a slide or flap provides a means in which the second output gap can be closed. The second stripper as well as, if necessary, the cover can by designed so that their position can be changed. The second stripper, and if necessary the cover, may be capable of being inserted in a longitudinal direction into the tool in their operational position, and be removed from the tool when not needed. Furthermore, a permanent connection between the second striper and the cover may be provided in the housing with a swivel bearing through which the cover and/or the second stripper can be pivoted in and out of their open and closed positions.

In another embodiment, the cover is made in the form of a slide and the second stripper is made in one piece so that the second stripper can slide from an open position in a guide into a closed position. In the closed position, the second stripper closes off the second output gap. The sliding direction is advantageously approximately perpendicular to the second output gap. This second stripper can be actuated easily using an actuating element extending out of the housing and connected to the second stripper, it being possible to lock said actuating element in an open and closed position. Thereby a compact design with few parts and improved operation is provided.

An alternative, advantageous embodiment exists which a flap is used as a cover and at the same time as a second stripper. It is hinged to the housing in such manner that in its open flap position it can be opened against the roller in an operational position of the stripper and carries out a guiding function for the rind towards the second output gap. In a closed flap position, however, the second output gap is closed and the movement of the rind to the first fixed stripper is made possible. The flap can be stopped in both flap positions by using known measures, such as by means of clamping screws.

An important object of the invention is to develop a de-rinding tool of this type so that the de-rinding output and thereby the handling of the de-rinding tool are improved for the vertical, downward de-rinding direction as well as for the horizontal de-rinding direction, so that the cut-off rind may not be drawn in again or may not interfere with the de-rinding process.

DETAILED DESCRIPTION OF THE INVENTION

Figure 1:
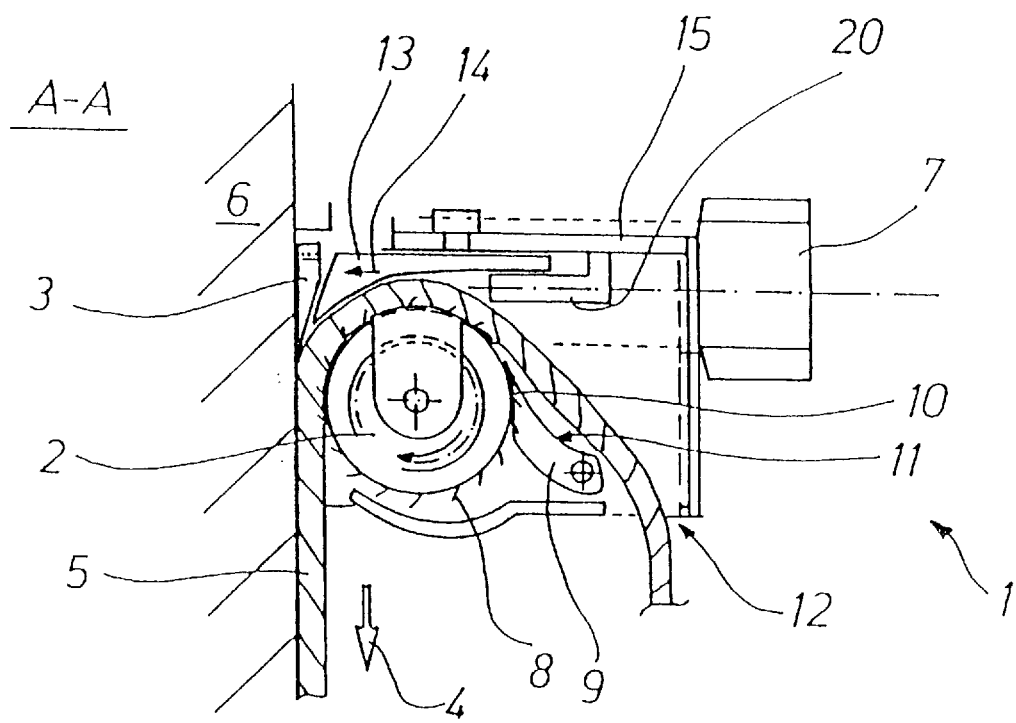
FIG. 1 shows a lateral view of the de-rinding device with a stripper adjustment for vertical, downward de-rinding with a cut along line AA of FIG. 2.

FIG. 1 shows de-rinding tool 1 with draw-in roller 2. De-rinding knife 3 separates rind strip 5 from the piece of meat 6. Draw-in roller 2 is driven in a clockwise direction by an electrical motor drive (not shown) and a downstream gear. Plug-in socket 7 is shown into which a drill machine drive can be plugged in and coupled. Draw-in roller 2 is provided with teeth 8 distributed over its circumference to hook into rind strip 5. Teeth 8 drag rind strip 5 from draw-in roller 2 to first fixed stripper 9 having a stripping edge 10 offset by approximately 180° relative to de-rinding knife 3. The stripper 9 strips and lifts rind strip 5 at that point from draw-in roller 2 and pushes it out through first output gap 12 if necessary over guiding surface 11.

In this configuration, a second, movable stripper 13 is shifted to the left into its closed position as shown by arrow 14 and is stopped there so that it allows the movement of rind strip 5 towards first stripper 9. Second stripper 13 is described in further detail in connection with FIG. 3.

Figure 2:
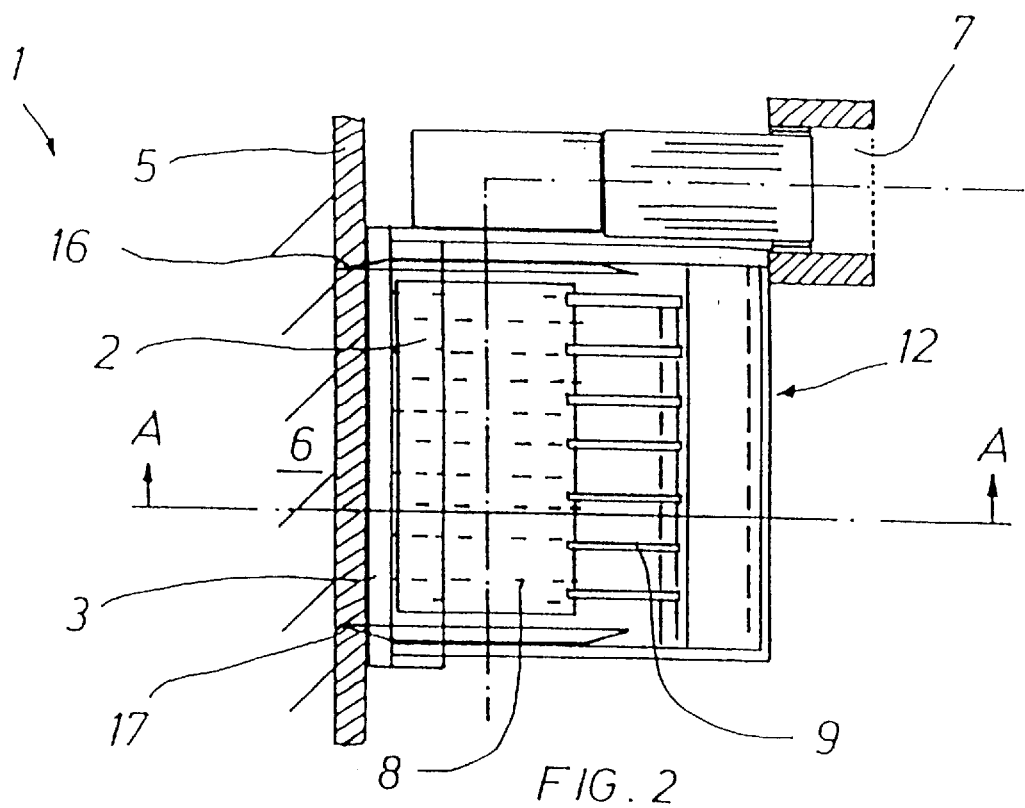
FIG. 2 shows a top view of the de-rinding tool of FIG. 1.

FIG. 2 shows a top view of de-rinding tool 1, in which rind strip 5 as well as the upper housing wall 15 (FIG. 1) have been omitted. It can be seen in FIG. 2 width-cutting knives 16 and 17 are provided on either side of draw-in roller 2 and are driven together with draw-in roller 2. These width-cutting knives are made in the form of cutting wheels which cut the edges of rind strip 5 down to piece of meat 6 due to the rotational movement.

Figure 3:
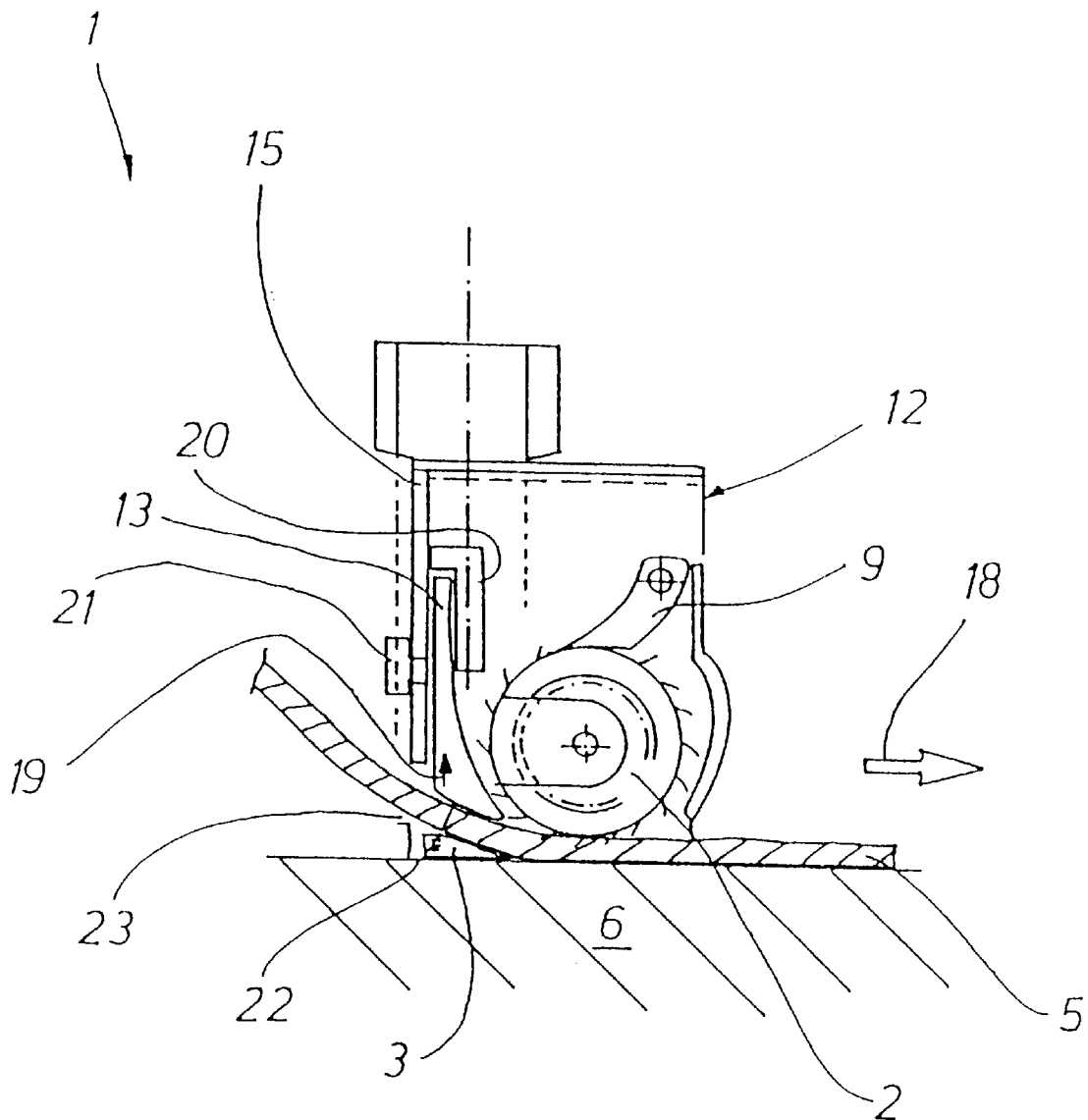
FIG. 3 shows the de-rinding tool of FIG. 1 with a stripper adjustment for horizontal de-rinding.

FIG. 3 shows de-rinding tool 1 rotated by 90° whereby piece of meat 6 and de-rinding direction 18 are horizontal. Second stripper 13 is moved up, in its open position, into guide 20 in the direction indicated by arrow 19 for horizontal de-rinding direction 18. Actuating element 21 extends to the outside through housing wall 15 and is connected to second stripper 13 to facilitate movement of second stripper 13.

Second stripper 13 is in its open position in FIG. 3, in which it strips rind strip 5 from draw-in roller 2 already in the zone of de-rinding knife 3 and with guiding surface 22, sends the rind strip to second output gap 23 which is located directly behind de-rinding knife 3. Thereby rind strip 5 is expelled in the opposite direction of de-rinding direction 18. In this position first stripper 9 and first output gap 12 are non-operational.

Figure 4:
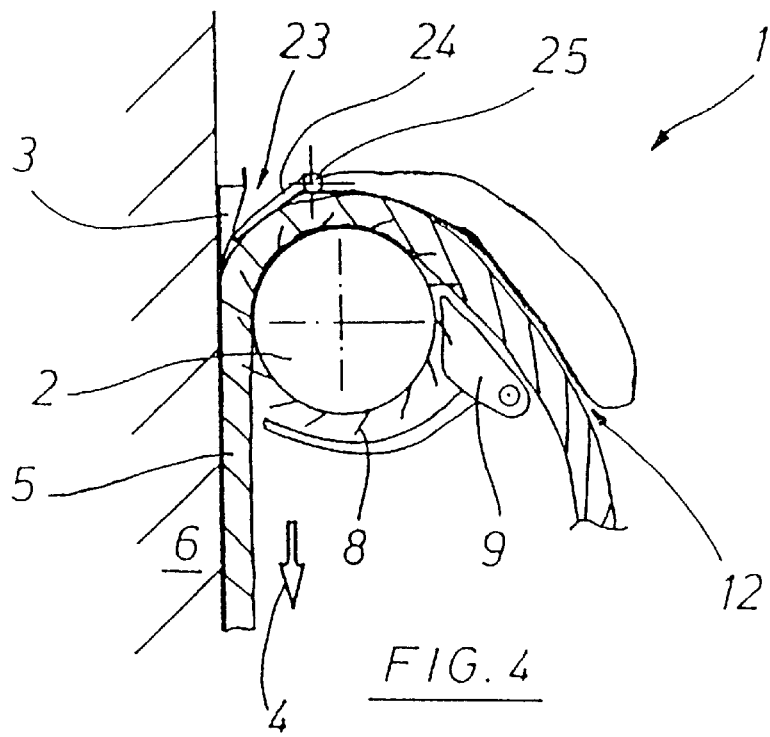
FIG. 4 shows a lateral view of a de-rinding tool of a second embodiment with a stripper adjustment for vertical, downward de-rinding; and, FIG. 5 shows the de-rinding tool of FIG. 4 with a stripper adjustment for horizontal de-rinding.
Figure 5:
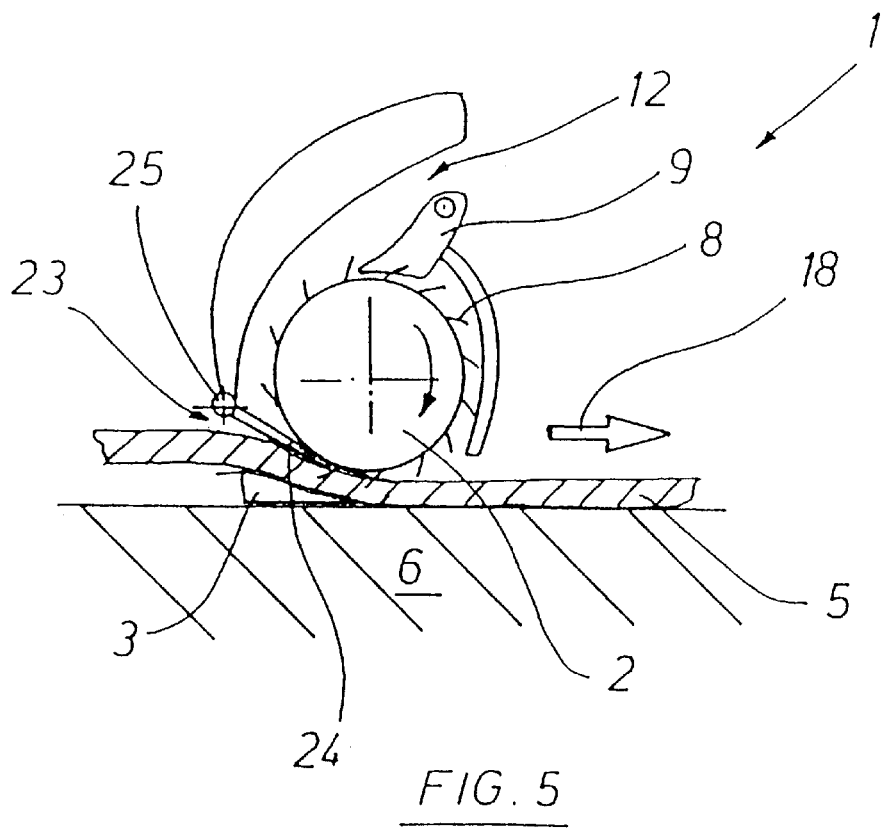

The embodiment of de-rinding tool 1 shown in FIGS. 4 and 5 is substantially the same as in FIGS. 1 and 3, with the parts having the same functions being and given the same reference numbers. Only the essential operational parts concerning de-rinding are shown for the sake of clarity.

Instead of sliding second stripper 13 of FIGS. 1 and 3, swiveling flap 24 is mounted on a swivel bearing in the housing and is used in the embodiment of FIGS. 4 and 5.

FIG. 4 shows flap 24 in a closed flap position in which it covers the second output gap 23 and in which it executes, at the same time, a guiding function for cut rind strip 5 in the direction of first output gap 12. This flap position is suitable for de-rinding in a vertically downward direction (arrow 4). It can be seen that in the case of horizontal de-rinding, rind strip 5 would emerge from output gap 12 and would position itself in front of the tool in such a manner that a danger of the rind strip being pulled back inside the housing is created. For this reason the flap position of flap 24 as indicated in FIG. 5 is proposed for the horizontal de-rinding direction (arrow 18).

In FIG. 5, flap 24, in its open position, is pushed against roller 2 in such manner that rind strip 5 is thus stripped off and is guided out of second output gap 23. Flap 24 can in this case be made in the form of a rake with gaps at the free flap edge allowing space through which the teeth of the roller can pass.

What is claimed is:

1. A de-rinding tool for pork rind including a tool housing having a de-rinding knife, a straight edge of a given width, a driven roller at a distance from the de-rinding knife edge which corresponds to the thickness of the rind so that the rind is cut off in a relative movement between the meat and the de-rinding knife, first and second output gap through which for the rind passes, wherein said device comprises:

a first stripper carried by said tool housing including a first stripping edge, said first stripper is offset generally 180° from the circumferential and rotational direction of said roller relative to said de-rinding knife, said stripper having a guiding surface for directing the rind to said first output gap which points generally in a de-rinding direction for a correspondingly oriented exit of the rind;

a second, movable stripper carried by said tool housing having a second stripper edge disposed in proximity of said de-rinding knife, said second stripper having an open position and a closed position;

in said open position, said second stripper strips the rind from said roller allowing the rind to exit said tool housing through said second out put gap, said first stripper and said first output gap are non-operational; and in said closed position a guiding surface of said second stripper guides the rind to a second output gap, said second output gap immediately follows said de-rinding knife and points in a direction generally opposite to said de-rinding direction for a correspondingly oriented rind output, said second stripper and said second output gap are non-operational in said closed position.

2. The device of claim 1 further comprising at least two width cutting knives disposed generally near either end of said de-rinding knife spaced generally at the width of said de-rinding knife edge, said width cutting knives perpendicular to said de-rinding knife, said width cutting knives having a cutting width at least as wide as said de-rinding knife and said roller.

3. The device of claim 1, further comprising an adjustable cover over said second output gap allowing said second output gap to be covered when said second stripper is in said closed position.

4. The device of claim 3, further comprising a slide carried by said second striper, said slide allows said second stripper to be moved from said closed position in a guide to said open position, said slide providing a cover to said second output gap when said second stripped is in said closed position.

5. The device of claim 4, wherein the sliding direction of said second stripper extends generally at a perpendicular to said second output gap and an actuating element connected to said second stripper extending to the outside of said housing allowing said second stripper to be moved into its open position and into its closed position.

6. The device of claim 5 wherein said second stripped can be locked in said open position or said closed position.

7. The device of claim 3, further comprising a flap carried by said tool housing, said flap used as said second stripper and articulated in such manner that it can be pushed in a open flap position or a closed flap position, in said open flap position, said flap is against said roller performing a guiding function for the rind to guide the rind to the second output gap, in said closed flap position, said flap closes off said second output gap while guiding the rind to said first output gap.

8. The device of claim 7 wherein said flap can be locked in said open flap position or said closed flap position.

9. The device of claim 8 wherein said width cutting knives are driven.

10. A de-rinding tool for pork rind allowing for horizontal or vertical de-rinding movement preventing the rind from interfering with the de-rinding process comprising:

a housing;

a de-rinding knife carried by said housing and having a straight blade edge of a predetermined width;

a driven roller carried by said housing for grasping the rind and directing the rind toward said de-rinding knife to drive the de-rinding knife between the meat and the rind to cut the rind away from the meat;

a first stripper carried by said housing and positioned generally on the opposite side of said roller from said de-rinding knife; said first stripper having a first stripping edge oriented in a direction opposite to a rotational direction of said roller, said first stripper edge being positioned between said roller and the rind to separate the rind from said roller when said housing is moved in the de-rinding direction;

a first output gap in said housing through which said rind exits said housing as the rind is stripped from said roller;

a second, movable stripper carried by said housing positioned generally in proximity to said de-rinding knife, said second stripper having an open position and a closed position;

a second output gap which allows the rind to exit the housing after being separated from the roller by said second stripper when said second stripper is in said open position;

said second stripper being disposed adjacent to said de-rinding knife in said closed position, for blocking said second output gap and directing the rind away from said de-rinding knife and toward said first output gap; and said second stripper being disposed adjacent to said roller in said open position, for separating the rind from said roller and directing the rind to said second output gap so that the rind exits said housing through said second output gap.

11. The device of claim 10, wherein said second stripper, in said open position, directs the rind so that the rind exits said housing in generally the opposite direction from the de-rinding movement so that the rind does not interfere with the de-rinding in the horizontal position.

12. The device of claim 11, including a lock for locking said second stripper in either said open position or said closed position.

13. The device of claim 12, including:

a pivot carried by said housing;

said movable second stripper being pivotally carried by said pivot so that said second stripper pivots from said closed position to said open position.

14. The device of claim 12 or 13 further comprising a pair of spaced circular cutting knives carried by said roller and cutting said rind to a width approximately the width of said de-rinding knife so that a rind strip is provided.

15. The device of claim 14 further comprising an adjustable cover carried by said housing for covering said second output gap when said second stripper is in said closed position.

16. The device of claim 15 comprising a slide mount carried by said housing for slidably receiving said second stripper allowing said second stripper to be moved from said open position in said guide to said closed position.

17. The device in claim 16 further comprising an actuating element carried by said second stripper extending outside said housing allowing said second stripper to be moved from said first position to said second position.

18. The device of claim 17 wherein said roller include teeth for grasping the rind and directing the rind toward said de-rinding knife.

19. The device of claim 18 wherein said first stripper is pivotally carried by said housing.

20. A de-rinding tool for pork rind for use so the rind exits the de-rinding tool in the same direction as the de-rinding movement comprising:

a housing;

a de-rinding knife carried by said housing and having a straight blade edge of a predetermined width;

a driven roller carried by said housing for grasping the rind and directing the rind toward said de-rinding knife to drive the de-rinding knife between the meat and the rind to cut the rind away from the meat;

a fixed stripper carried by said housing and positioned generally on the opposite side of said roller from said de-rinding knife; said stripper having a stripping edge oriented in a direction opposite to a rotational direction of said roller, said stripper edge being positioned between said roller and the rind to separate the rind from said roller when said housing is moved in the de-rinding direction; and an output gap in said housing through which said rind exits said housing as the rind is stripped from said roller in a direction which is the same as a direction of movement of operation of said de-rinder.

21. The device of claim 20 further comprising a pair of spaced circular cutting knives carried by said roller and cutting said rind to a width approximately the width of said de-rinding knife so that a rind strip is provided.

22. The device of claim 21 wherein said roller includes teeth for grasping the rind and directing the rind toward said de-rinding knife.

23. The device of claim 22 wherein said stripper is pivotally carried by said housing.

* * * * *